No. 847,298. PATENTED MAR. 12, 1907.
C. L. SULLIVAN.
FISHING ROD ATTACHMENT.
APPLICATION FILED OCT. 4, 1905.
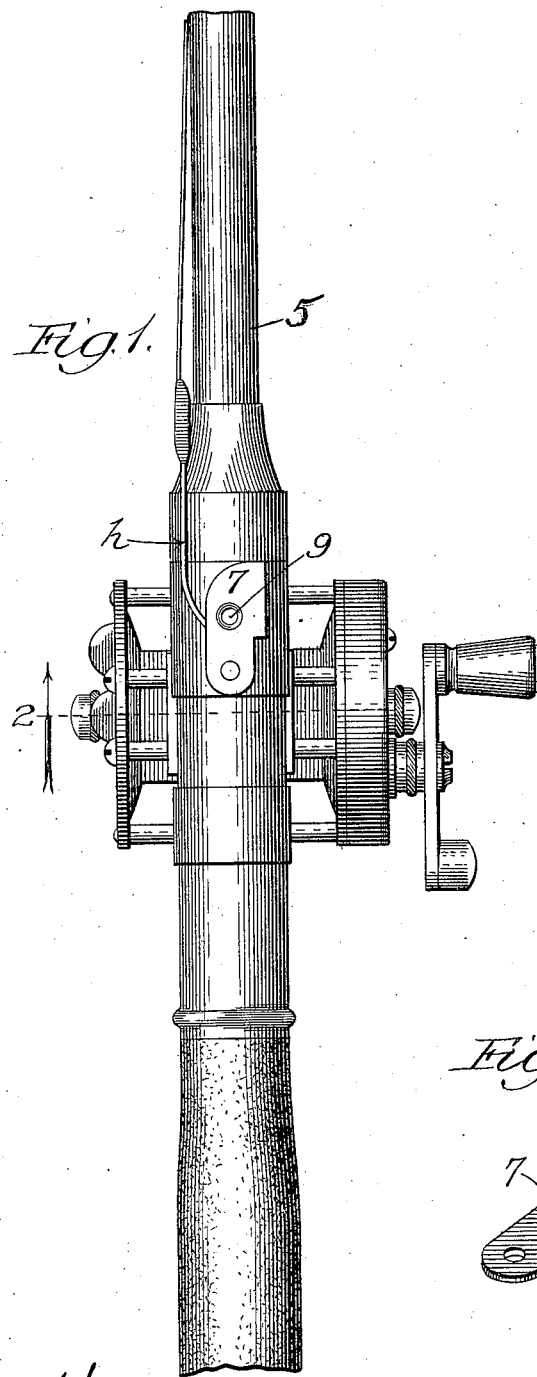
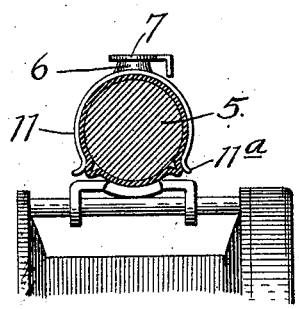
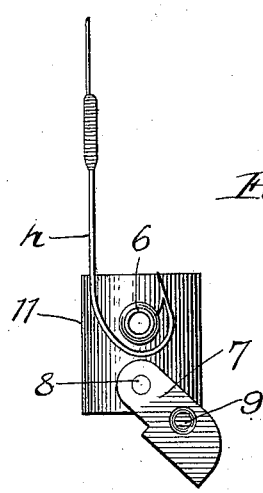
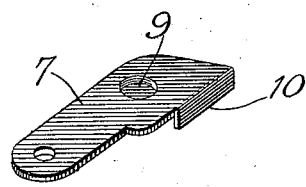
Witnesses.
R. J. Cook
Archworth Martin
Inventor:
Charles L. Sullivan
By Attys Synnestvedt & Carpenter

UNITED STATES PATENT OFFICE.

CHARLES LOUIS SULLIVAN, OF CHICAGO, ILLINOIS, ASSIGNOR, BY MESNE ASSIGNMENTS, OF ONE-HALF TO MARY ELIZA BENNETT SULLIVAN, OF CHICAGO, ILLINOIS.

FISHING-ROD ATTACHMENT.

No. 847,298.   Specification of Letters Patent.   Patented March 12, 1907.

Application filed October 4, 1905. Serial No. 281,250.

*To all whom it may concern:*

Be it known that I, CHARLES LOUIS SULLIVAN, a citizen of the United States, residing at Chicago, in the State of Illinois, have invented a certain new and useful Fishing-Rod Attachment, of which the following is a specification.

My invention relates to fishing rods or poles and more particularly to means provided thereon for holding fish-hooks in a safe and convenient manner when not in actual use. The objects of the invention are, to provide a convenient device either fixed on or attachable to any form of fishing pole or rod by which the fish-hook can be secured and safe guarded when it is not in actual use, and to provide such a hook-guard of a form that can be readily attached to any kind of fish-rod or pole or may be integral with the pole at the first manufacture. I have shown a preferred form of the device in the accompanying drawing and attached to an ordinary fishing-rod such as used for the attachment of reels, and in the drawing—

Figure 1 represents the handle end of a fish-rod supplied with reel and having my hook-guard attached thereto and the hook in place under the same;

Figure 2 is a cross section of the rod showing my hook-guard, and

Figure 3 is a plan of the hook-guard in position with the hook thereon but with the guard thrown open;

Figure 4 is a perspective view of the guard alone, detached from the holding ring.

In the use of fishing rods, especially those that have a reel, in which it is not desirable to leave the hook at the end of the pole, it has frequently been noticed that it is very inconvenient to leave the hook lying around loose which results in destroying good hooks and in great danger to the operator handling the pole. For these reasons I have provided a means for drawing the hook and line down and fastening the hook in a safe place near the handle, where it can be easily reached, while the hook is not being used. In the accompanying drawing it will be seen that on some part of the rod or pole 5 I have provided a stud 6, around which the hook may be looped as shown in Figure 3 and this stud is covered and protected by a guard 7, which is pivoted at 8, and has preferably a depressed portion 9 fitting the top of the stud 6 to hold the guard in place. The guard 7 also has a depending flange 10 which will engage the side of the pole and hold it firmly in position, and act as an additional guard to the point of the hook. In the form shown I have mounted the stud 6 and the guard 7 upon a separate ring 11, which, as will be seen from Figure 2 may be readily applied to any form of pole or any place thereon. Otherwise, it will of course be understood that in the original making of the reel and forming the pole parts, the stud 6 and the guard 7 may be attached directly upon some fixed portion of the pole handle, being either integral or separable as may be desired. In the form as shown in Figure 2, the ring 11 with the free edges 11ª may be snapped over any form of pole and may be put upon it at any desired place. In some instances it may be desirable to have this ring formed so that it may slide backward and be adjusted somewhat in position on the pole as shown in Figure 1. It will also be apparent that other forms of supporting means than the clip shown might be used, as for instance, a continuous band secured either rigidly or movably about the reel or pole at any desired point. The essential features in the invention, however, are the broad idea of providing upon the pole a holder and guard for the hook when not in use.

Having thus described my invention and illustrated its use, what I claim as new and desire to secure by Letters Patent, is the following:

1. A fish hook holder comprising a stud adapted to receive a hook, and a co-operating plate pivoted in position to swing over the hook on the stud in a plane at substantially right angles to the axis of the stud.

2. A fish hook holder comprising a stud adapted to receive a hook, and a co-operating plate mounted in position to move over the hook and stud in a plane at substantially right angles to the axis of the stud.

3. A fish hook holder comprising a stud, a pivot adjacent thereto and having an axis parallel to the axis of the stud, and a plate mounted to swing on such pivots over the top of the stud.

4. A fish-hook holder and guard comprising a sleeve having a stud thereon and a cover plate arranged to swing over the stud and guard the hook, substantially as described.

5. A fish hook holder comprising a stud, a pivot adjacent thereto and having an axis parallel to the axis of the stud, a plate mounted to swing on such pivot over the top of the stud, and means on the plate for releasably engaging the top of the stud.

6. A hook-guard comprising a ring 11 having a hook retaining stud thereon and a pivoted cover-plate provided with a guard flange and means to hold the guard in place on the stud or to readily release it to allow sidewise removal of the hook, substantially as described.

7. A fish hook holder comprising a stud, a pivot adjacent thereto and having its axis parallel to the axis of the stud, and a plate having a downwardly extending flange at one edge and mounted to swing on the pivot over the top of the stud.

In testimony whereof I have hereunto signed my name in the presence of the two subscribed witnesses.

CHARLES LOUIS SULLIVAN.

Witnesses:
PAUL CARPENTER,
ALBERT GRANT MILLER.